United States Patent
Cot et al.

(10) Patent No.: US 11,940,008 B2
(45) Date of Patent: Mar. 26, 2024

(54) RECIRCULATION OF LUBRICANT IN A TURBOMACHINE ROLLING-ELEMENT BEARING

(71) Applicant: SAFRAN POWER UNITS, Toulouse (FR)

(72) Inventors: Serge Marie Gabriel Cot, Moissy-cramayel (FR); Jean-Paul Salvador Lopez, Moissy-cramayel (FR); Stephane Chevalier, Moissy-cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 235 days.

(21) Appl. No.: 17/597,382

(22) PCT Filed: Jul. 9, 2020

(86) PCT No.: PCT/FR2020/051247
§ 371 (c)(1),
(2) Date: Jan. 4, 2022

(87) PCT Pub. No.: WO2021/005315
PCT Pub. Date: Jan. 14, 2021

(65) Prior Publication Data
US 2022/0316527 A1 Oct. 6, 2022

(30) Foreign Application Priority Data

Jul. 10, 2019 (FR) ...................................... 1907709

(51) Int. Cl.
*F16C 33/66* (2006.01)

(52) U.S. Cl.
CPC ...... *F16C 33/6681* (2013.01); *F16C 33/6677* (2013.01); *F16C 2360/23* (2013.01)

(58) Field of Classification Search
CPC .............. F16C 33/6659; F16C 33/6677; F16C 33/6681; F16C 2360/23; F01D 25/16; F01D 25/162; F01D 25/18
See application file for complete search history.

(56) References Cited

U.S. PATENT DOCUMENTS 3,811,743 A * 5/1974 Wren ................... F16C 33/6677
384/475
4,286,829 A * 9/1981 Heemskerk ......... F16C 33/7886
384/469

(Continued)

FOREIGN PATENT DOCUMENTS

EP 0034084 A1 8/1981

OTHER PUBLICATIONS

International Search Report and Written Opinion received for PCT Patent Application No. PCT/FR2020/051247, dated Nov. 11, 2020, 17 pages (7 pages of English Translation and 10 pages of Original Document).

*Primary Examiner* — Alan B Waits
(74) *Attorney, Agent, or Firm* — WOMBLE BOND DICKINSON (US) LLP

(57) ABSTRACT

Rolling-element bearing for a turbomachine of an aircraft, comprising an inner ring (3) defining a first raceway (112), and an outer ring (4) defining a second raceway (124), characterized in that the bearing has at least one loop circuit (21, 22) for forced recirculation of lubricant, this loop circuit comprising a first recirculation circuit (21) comprising at least one lubricant inlet (1200) located on the second raceway (124), and connected by at least one duct (120, 166) created in the outer ring (4) to at least one lubricant outlet (1661) which discharges into a second recirculation circuit (22) of the loop circuit (21, 22), this second recirculation (Continued)

circuit (22) comprising at least one duct (152, 1134, 1136; 1135, 1136) created in the inner ring (3).

14 Claims, 5 Drawing Sheets

(56) References Cited

U.S. PATENT DOCUMENTS

| | | |
|---|---|---|
| 4,479,682 A | 10/1984 | Olivier |
| 6,464,401 B1 * | 10/2002 | Allard ............... F16C 35/063 |
| | | 384/571 |

* cited by examiner

[Fig.1]
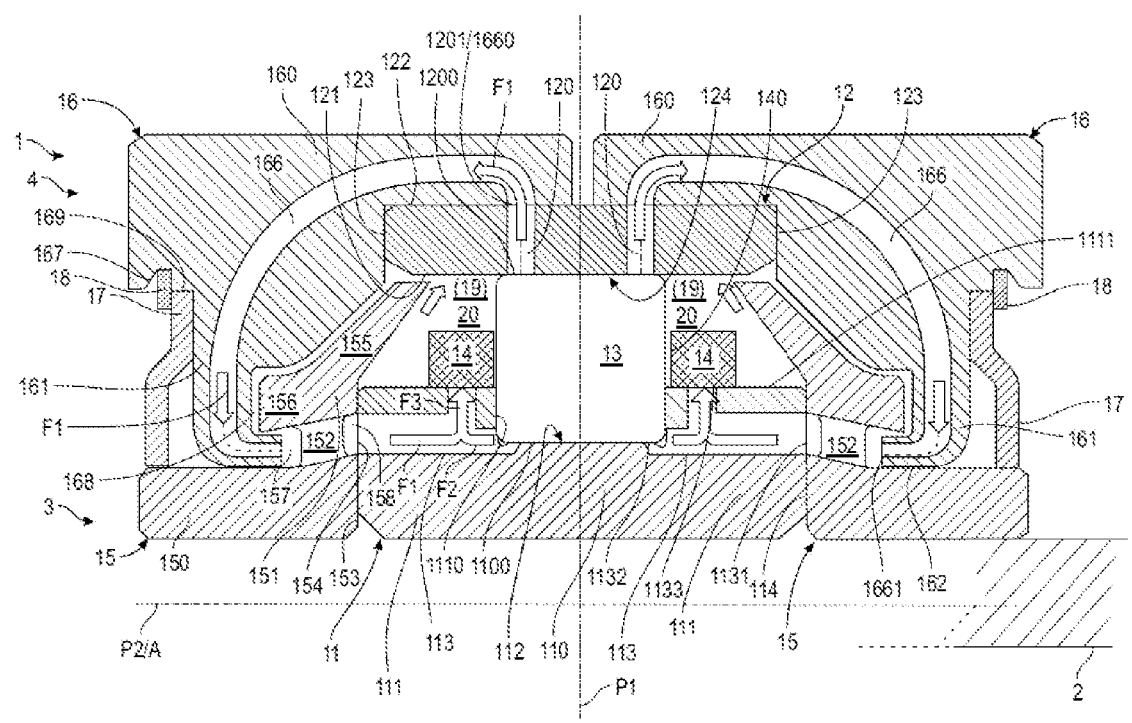

[Fig.2A]
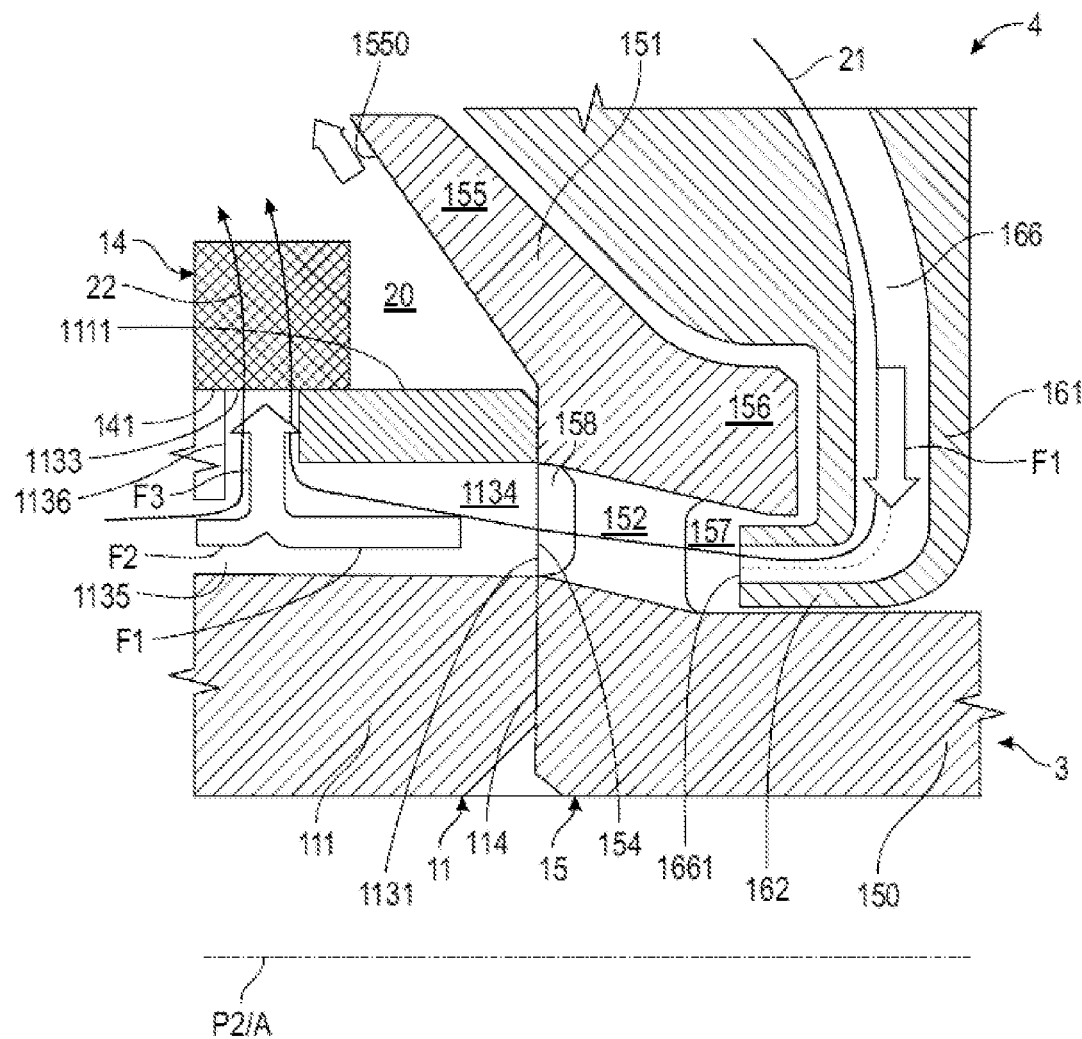

[Fig.2B]
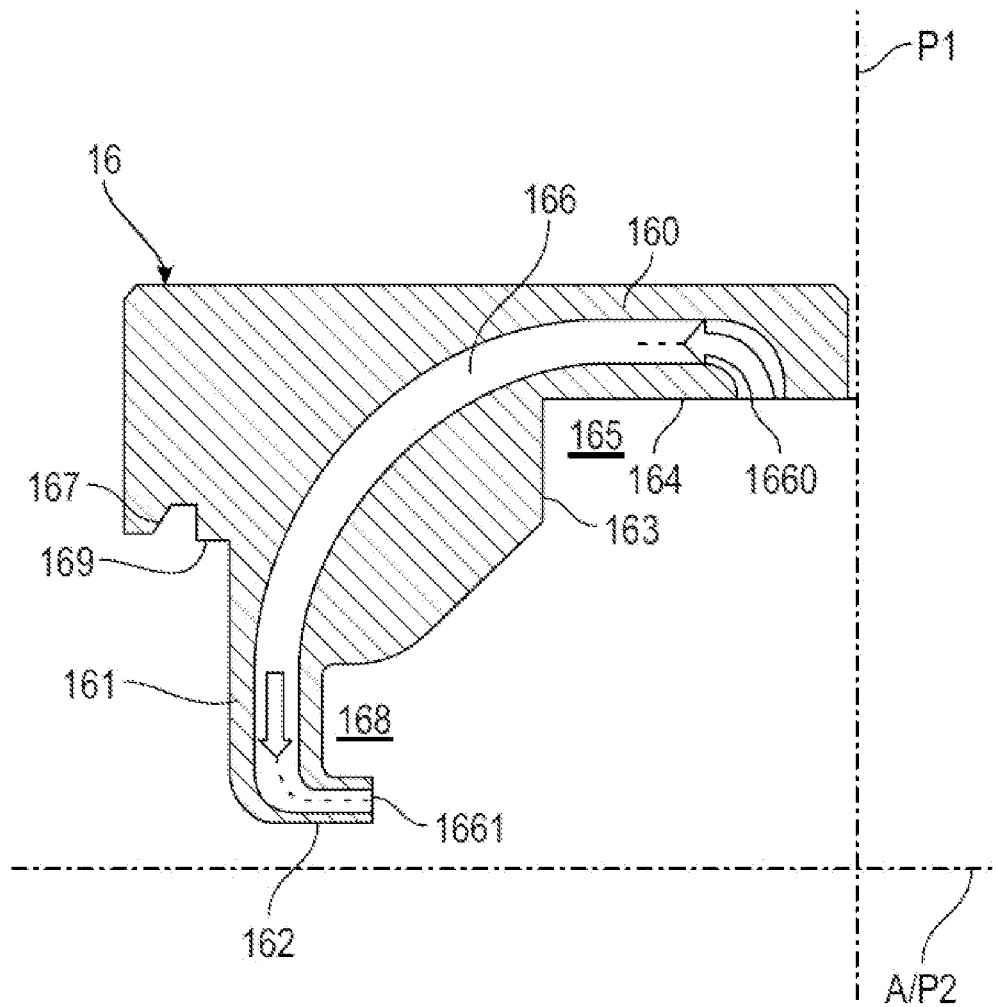

[Fig.3]
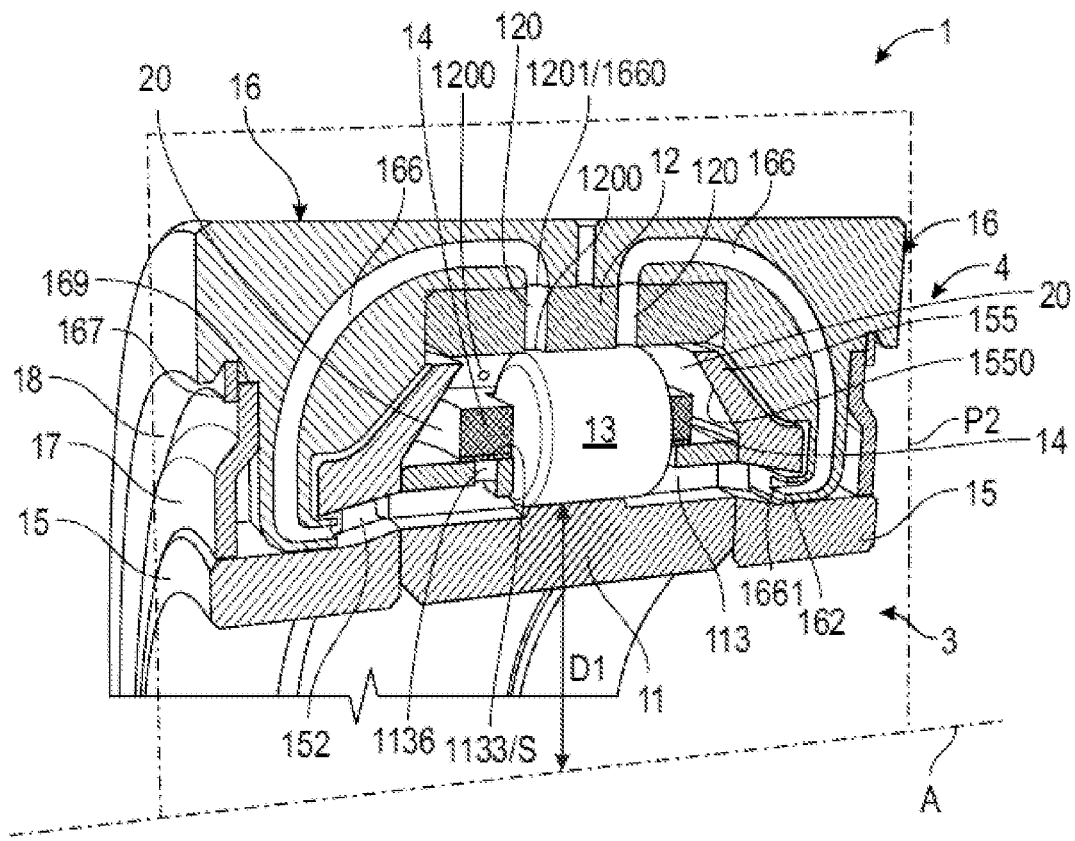

[Fig.4]
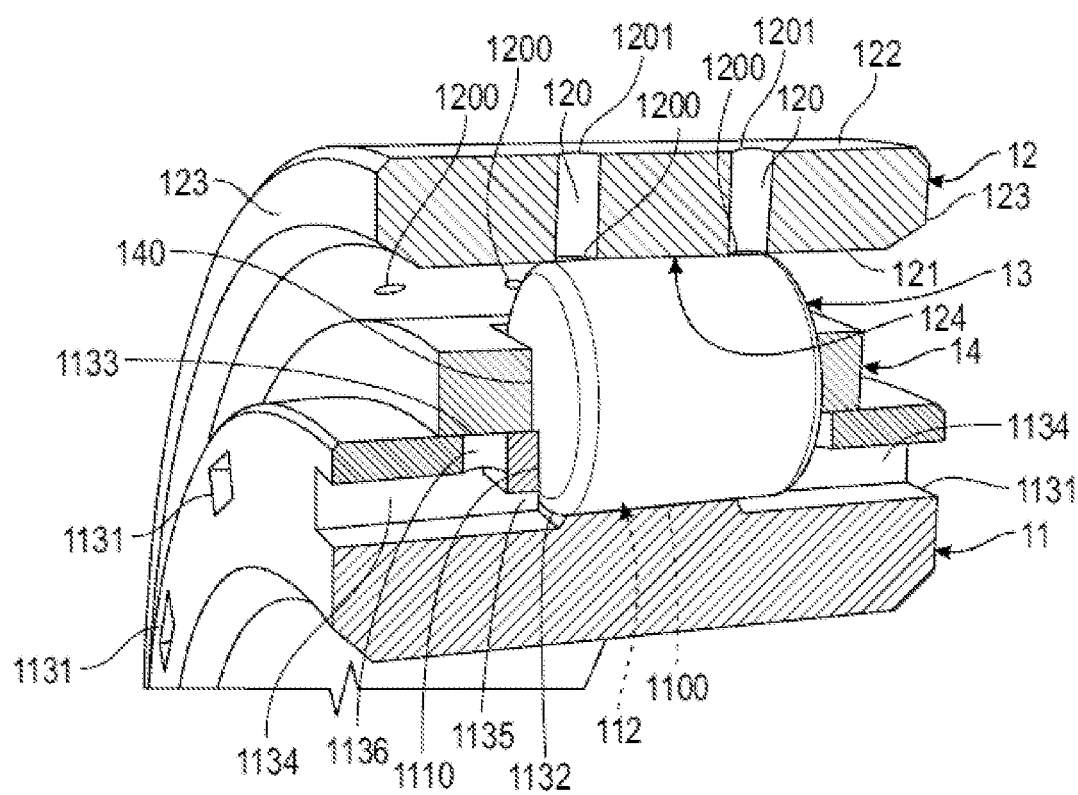

RECIRCULATION OF LUBRICANT IN A TURBOMACHINE ROLLING-ELEMENT BEARING

TECHNICAL FIELD OF THE INVENTION

The invention relates to a rolling-element bearing for a turbomachine, in particular for an aircraft, this bearing comprising a lubricant recirculation circuit.

BACKGROUND

The gas generators such as those used for the aeronautical auxiliary power units, or other types of devices using small turbomachines, typically have bearings for their rotating shafts, provided with rolling-elements that are subject to a lubrication. To ensure this lubrication, an external lubrication system is provided, which comprises a pump, a distribution circuit, and various components such as valves and solenoid valves. This external lubrication system degrades the performance of the engine (in particular in terms of specific power and reliability) and represents a significant part of the overall cost of the engine.

The lubricant (oil or grease) used to lubricate a bearing of this type is injected into the bearing and helps lubricate it for a limited period of time. The lubricant tends to migrate and stagnate in areas referred to as dead areas. It can be recycled but is then re-injected into the lubrication system.

It has already been proposed to equip a rolling-element bearing with a lubricant recirculation circuit. However, in practice, the lubricant recirculation is not reliable and is not optimal.

SUMMARY OF THE INVENTION

The invention offers a simple, effective and economical solution to this problem by means of a bearing of the self-lubricated type, i.e. one that does not necessarily require an external lubrication system.

The invention thus advantageously proposes a rolling-element bearing for a turbomachine, in particular for an aircraft, comprising:
- an internal ring defining a first raceway having a first diameter,
- an external ring defining a second raceway,
- a plurality of rolling-elements disposed between the internal and external rings and adapted to roll on the first and second raceways,
wherein the bearing has at least one loop circuit for forced recirculation of lubricant, this loop circuit comprising a first recirculation circuit comprising at least one lubricant inlet located at the level of the second raceway, and connected by at least one duct created in the external ring to at least one lubricant outlet which opens onto a second recirculation circuit of the loop circuit, this second recirculation circuit comprising at least one duct created in the internal ring.

In the bearing according to the invention, each lubricant inlet of the first recirculation circuit forms an orifice opening onto the second raceway, the rolling-elements being able to roll over this orifice.

This configuration has the advantage of generating a recirculation of the lubricant by pump effect. This pump effect is achieved by the fact that the circuit opens directly onto at least one of the raceways. The rolling-elements roll over the outlets of the circuit and force the lubricant in the raceway to be injected into the or each lubricant inlet. The recirculation of the lubricant is therefore activated without the need for an external pumping means such as a hydraulic pump. This allows to reduce the number of components implemented for the lubrication of the bearing, to reduce the operating cost (no need to supply energy to an external pumping means) and the manufacturing cost (reduction of the assembling complexity). Being able to do without an external pumping system also allows the mass of the turbomachine to be limited.

The invention allows to usefully take advantage of the centrifugal force, which in the bearings of the self-lubricated type of the prior art tends to throw the lubricant towards dead areas of the external portion of the bearing which does not rotate, the lubricant remaining trapped in these dead areas in which it stagnates. The higher the speed of rotation of the internal portion of the bearing, the greater the centrifugal force. By creating a circuit forming a loop of forced recirculation of lubricant with at least one inlet in the external portion of the bearing, dead areas in which the lubricant would stagnate are avoided.

The bearing according to the invention may comprise one or more of the following characteristics, taken alone or in combination with each other:
- each lubricant inlet of the first recirculation circuit forms an orifice opening onto the second raceway;
- at least one lubricant outlet of the first recirculation circuit is formed by a discharge orifice located at a distance from an axis of the bearing less than or equal to the first diameter of the first raceway;
- the bearing further comprises a cage interposed between the rings and holding the rolling-elements spaced apart, said cage comprising at least one internal surface which is adapted to slide on an external surface of the internal ring, and wherein at least one radially oriented duct of the second recirculation circuit opens from said external surface facing said internal surface, said internal surface having a diameter slightly greater than a diameter of said external surface so that the lubricant coming from the radially oriented duct can open into a cavity of the housing of the cage;
- the rolling-elements as well as the external surface of the internal ring and the internal surface of the cage are cylindrical;
- the first recirculation circuit comprises at least two lubricant inlets aligned along an axial direction parallel to an axis of the bearing.
- the first recirculation circuit comprises a series of pairs of lubricant inlets located at the level of the second raceway and a series of pairs of ducts associated with said lubricant inlets, the pairs of ducts being evenly distributed around an axis of the bearing, and the ducts of each pair extending substantially in a same plane passing through this axis;
- the first recirculation circuit comprises at least two ducts created in the external ring and which extend on either side of a median plane of the bearing, perpendicular to said axis and passing substantially in the middle of the bearing;
- the ducts of each pair are symmetrical with respect to a median plane perpendicular to said axis and passing substantially in the middle of the bearing;
- each duct of the first recirculation circuit comprises a first portion extending radially outwardly from the lubricant inlet and extended by a second portion which progresses mainly towards an axis of the bearing, this second portion leading to the lubricant outlet which opens onto the second recirculation circuit;

the lubricant outlet is engaged in a lubricant inlet manifold of the second recirculation circuit formed by an annular recess of the internal ring, said annular recess having a bottom which opens out into at least one duct of the second recirculation circuit;

the rolling-elements are rollers, in particular cylindrical; this type of rolling element has the advantage that it can be used at high speeds of rotation and in high temperature ranges. They are particularly suitable for their use in an aircraft turbomachine;

the bearing comprises sealing systems between the internal and external rings on either side of said rolling-elements;

the internal ring or at least one element which is rotationally integral with the internal ring, comprises annular ribs for guiding lubricant by centrifuging towards said lubricant inlet, these annular ribs extending on both sides of the rolling-elements towards the external ring.

The invention also relates to a turbomachine, in particular for an aircraft, comprising at least one bearing comprising one or more of the characteristics described above, and wherein the internal ring of the bearing is rotationally integral with a rotary shaft of the turbomachine while the external ring is attached to a stator portion of the turbomachine.

BRIEF DESCRIPTION OF FIGURES

Further characteristics and advantages of the invention will become apparent from the following detailed description, for the understanding of which reference is made to the attached drawings in which:

FIG. 1 is a schematic representation in axial section of a portion of a rolling-element bearing according to an embodiment of the invention, and of a flow of lubricant during the rotation of said bearing;

FIG. 2A is an enlarged detail of a cooperation of an internal ring and an external ring belonging to the bearing of FIG. 1;

FIG. 2B is a cross-sectional view of a portion of a side ring belonging to the bearing of FIG. 1;

FIG. 3 is a cross-sectional and perspective view of the bearing portion of FIG. 1;

FIG. 4 is a cross-sectional and perspective view of some elements of the bearing according to the embodiment.

DETAILED DESCRIPTION OF THE INVENTION

FIG. 1 shows a schematic cross-section of the portion of a recirculating bearing 1 located on a first side of a rotational axis A of the bearing 1. The bearing 1 is for example mounted on a shaft 2.

In general, in the following description, the terms "longitudinal" and "axial" refer to the orientation of structural elements extending in the direction of the axis of rotation A. The term "radial" refers to an orientation of structural elements extending in a direction perpendicular to the axis of rotation A.

Furthermore, when the cross-section of an annular element is described, reference is made only to the portion on one side of the axis of rotation A of the bearing 1, the other portion being obtained by mirror image with respect to the axis A in the plane of the figures, for example.

The bearing 1 comprises an internal ring 3, an external ring 4, a plurality of rolling-elements 13. The internal ring 3 and the external ring 4 are intended to pivot relative to each other about the axis of rotation A (FIGS. 1, 2A and 3).

Here, the bearing 1 further comprises a cage 14, two sealing systems 17, here in the form of sealing rings, and two attachment annulus 18 (FIG. 1).

The internal ring 3 comprises a middle ring 11 and two side rings 15.

The external ring 4 comprises a middle ring 12 and two side rings 16.

The middle rings 11 and 12, as well as the side rings 15, the side rings 16, the sealing rings 17 and the attachment annulus 18 are generally annular, i.e. they have a shape of revolution about the axis of rotation A (FIGS. 1 and 3).

In addition, the bearing 1 is symmetrical with respect to a plane of symmetry P1 or median plane, i.e. in mirror image with respect to the plane P1. In particular, the internal ring 3, the external ring 4, each rolling element 13 and the cage 14 are here provided symmetrically with respect to the plane P1 (FIG. 1).

Here, the rolling-elements 13 are rollers, in particular cylindrical ones.

The cage 14 defines a plurality of housings 140 in each of which a respective rolling element 13 is housed (FIGS. 1 and 4). The purpose of the cage 14 is to keep the rolling-elements 13 spaced apart.

The middle ring 11 has a middle section 110 and two side sections 111 (FIG. 1). The middle 110 and side 111 sections are each, as sub-portions of the middle ring 11, generally annular in shape. The middle section 110 has a smaller outside diameter than the side sections 111. The middle 110 and side 111 sections define between them an internal track or first raceway 112, on which the rolling-elements 13 are intended to move by rolling. Here, the first raceway 112 is defined by an axially oriented cylindrical annular surface 1100 (FIGS. 1 and 4). Two radially oriented flat surfaces 1110, located on either side of the axially oriented portion 1100, serve as axial positioning (centring) stops for the rolling-elements 13. The flanks of the rolling-elements 13 may slidingly abut against either of the two surfaces 1110.

Ducts 113 are arranged in the middle ring 11. More specifically, the ducts 113 pass through the middle ring 11 so as to open out here each into three orifices 1131, 1132 and 1133. For simplicity, only a (first) duct 113 is mentioned here, a second duct 113 symmetrical to the plane P1 has a similar configuration. In addition, further similar ducts 113 are provided in the ring 11 at an angular distance from each other about the axis of rotation A.

The orifice 1131 is provided on an end face 114 of the middle ring 11 (FIGS. 1 and 2A). An orifice 1132 is provided on a surface on each side of the first raceway 112 (FIGS. 1, 2A and 4). More specifically, the orifice 1132 is here provided at the level of an edge of the annular surface 1100, and such that the rolling-elements 13 can roll over it so that lubricant present on the surface of the rolling-elements and on the first raceway 112 is forced to enter into the orifice 1132. The orifice 1132 thus forms a lubricant inlet. The orifice 1133 is a discharge orifice, i.e., forming a lubricant outlet. The lubricant outlet 1133 is provided on an external cylindrical surface 1111 which externally bounds the side sections 111 of the ring 11 (FIGS. 1 and 2A). The ducts 113 may be subdivided into sub-ducts 1134, 1135 and 1136 (FIG. 2A). The sub-ducts 1134 and 1135 are axially oriented. Here, the sub-duct 1136 is radially oriented. The sub-ducts 1134 and 1135 are aligned with each other. The sub-duct 1136 extends transversely to the sub-ducts 1134 and 1135. The sub-ducts 1134, 1135 and 1136 are in fluid communication with each other from the orifices 1131, 1132 and 1133 respectively.

The middle ring 12 comprises a plurality of ducts 120, an internal annular surface 121 and an external annular surface 122 (FIGS. 1 and 4). Here, the ducts 120 are radially oriented. Each duct 120 opens onto the internal annular surface 121 through an internal orifice 1200 and onto the external annular surface 122 through an external orifice 1201.

The middle ring 12 is here axially delimited by two end faces 123, preferably flat.

A middle portion 124 of the internal annular surface 121 forms an external track, or second raceway, on which the rolling-elements 13 contact and are intended to roll. The orifices 1200 are provided on the second raceway 124, such that the rolling-elements 13 can roll over them so that lubricant is forced into these orifices. The orifices 1200 thus form lubricant inlets. If the rolling-elements 13 are rollers, the raceway 124 is cylindrical. Advantageously, each roller may have a very slightly domed shape on either side of a cylindrical contact area of the roller on the second raceway 124. This domed shape allows to have locally on the roller a diameter very slightly smaller than the diameter of the roller, defined as the diameter of its cylindrical contact area. This cylindrical contact area may be symmetrical with respect to the plane P1, and its length may be between one quarter and two thirds of the length of the roller.

Preferably, the orifices 1200 are provided on either side of the cylindrical contact area on the second raceway 124, so that the rollers do not come into contact or come into very little contact with the two annular portions of the second raceway 124 on which the orifices 1200 are provided. Indeed, the very slightly domed shapes of the rollers are provided so that there is no contact, or alternatively a contact with a very limited contact pressure, between a roller and the edge of an orifice 1200. This avoids, for example, generating an etching start at the level of an orifice 1200, whereas such etching could occur in the event of high contact pressure due to the high localized stresses that would develop at the level of the orifices 1200.

Thus, in the case where the rolling-elements 13 are rollers, the fact that these rolling-elements can roll on the orifices 1200 does not necessarily imply a contact between the rolling-elements and the two annular portions of the second raceway 124 on which the orifices are provided. Nevertheless, in all cases, the passage of a roller over an orifice is carried out with contact or quasi-contact between the roller and the raceway 124 at the level of the orifice, so that the oil pumping effect provided is not significantly affected by the possible absence of contact (quasi-contact).

The elements 15 to 18 are identical in pairs respectively. Each element 15 to 18 of the pairs of elements 15 to 18 is arranged symmetrically to the other element 15 to 18 with respect to the plane P1 transverse to the axis of rotation A (FIG. 1).

The side rings 15 have an internal portion 150 and an external portion 151 which are integral in rotation. Both the internal 150 and external 151 portions are substantially annular. Ducts 152 are formed by passages through the junction between the internal 150 and external 151 portions. The ducts 152 are here oriented close to, but not limited to, an axial direction, preferably with an inclination of some angle, for example less than 20°, to the axial direction so that the centrifugation of the lubricant passing through the ducts 152 forces the flow of the lubricant to the ducts 113 which pass through the middle ring 11. The internal portion 150 and the external portion 151 are made integral with each other here (FIGS. 1 and 2A), which can be advantageously achieved by additive manufacturing in order to form, in particular, ducts 152 that may have complex curves. The external portion comprises two annular ribs 155 and 156 in the form of annular ribs. Viewed in cross-section, the annular rib 155 here forms a nose extending obliquely away from the internal portion 150, that is, away from the internal portion 150, both radially outwardly and axially. As will be described below, the annular rib 155 is intended to provide a centrifugal lubricant guidance. Viewed in section, the other annular rib 156 here forms an axially extending nose, substantially parallel to the internal portion 150. The annular ribs 155 and 156 extend axially substantially opposite each other. A first annular recess 157, in fluid communication with the ducts 152, is defined between the annular rib 156 and the internal portion 150. This first annular recess 157 forms a lubricant inlet manifold of the second recirculation circuit 22. A second annular recess 158, in fluid communication with the ducts 152, is defined between the annular rib 155 and the internal portion 150. The second annular recess 158 opens through an orifice 154, which is here an annular opening, onto an end face 153, here a flat one.

The side rings 16 of the external ring 4 are the radially outermost elements in the bearing 1 (FIG. 1).

Each side ring 16 comprises an axial segment 160 and a radial segment 161 (FIGS. 1 and 2B). The axial 160 and radial segments 161 are generally L-shaped with respect to each other, the radial segment 161 extending radially inwardly from the axial segment 160. However, an annular rim 162 extends axially from the radial segment 161 in the same direction as the axial segment 160.

The side rings 16 comprise an annular surface 164, inwardly delimiting the axial segment 160, and a radial surface 163, transverse to the annular surface 164. The surfaces 163 and 164 define an annular space 165 intended to house the middle ring 12 (FIG. 2B). The surfaces 163 and 164 of the side ring 16 then form a stop for the surfaces 123 and 122 of the middle ring 12 (FIG. 1).

Each side ring 16 comprises a plurality of ducts 166. Each duct 166 opens onto the surface 164 through an inlet orifice 1660 (FIG. 2B). The ducts 166 extend through the respective side ring 16 from the inlet orifices 1660, and more specifically through the axial segment 160, the radial segment 161 and then the annular rim 162, to a discharge orifice 1661.

In addition, the side rings 16 each have an annular space 168 delimited radially and internally by the annular rim 162, and axially by the radial segment 161. Each annular space 168 is intended to house the annular rib 156 of the corresponding side ring 15 (FIG. 1).

A cavity 20 is delimited between the middle ring 11, the middle ring 12, the side rings 15, the side rings 16 and the sealing rings 17 (FIG. 1). The cavity 20 forms a closed fluid-tight volume in which the assembly formed by the rolling-elements 13 and the cage 14 is housed in a lubricant bath 19.

In the bearing 1, the sealing rings are radially housed between a shoulder 169 of the ring 16 and the internal portion 150 of the ring 15, and at least partially against the radial segment 161 (FIGS. 1 and 3). The sealing to rings 17 seal the cavity 20 and keep the lubricant 19 contained within. The bearing 1 is thus lubricated in a closed circuit.

On the side rings 16, a gorge 167, open in the direction of the axis of rotation A, is intended to receive an attachment annulus 18 (FIGS. 1, 2B and 3). The attachment annulus 18 then serves to hold the sealing rings 17 on the side rings 16.

The relationship of the above elements to each other and the operation of the bearing are now described in more detail.

In the illustrated embodiment in which the bearing 1 is mounted on the shaft 2 (FIG. 1), the internal ring 3 forms a movable assembly, while the external ring 4 forms, in a non-limiting manner, a stationary assembly, for example attached to a stationary reference member, not shown here, of an aircraft.

The rolling-elements 13 are sandwiched radially between the middle ring 11 of the internal ring 3 and the middle ring 12 of the external ring 4 (FIGS. 1 and 3). The rolling-elements 13 are then in contact with the first raceway 112 and the second raceway 124, and adapted to roll on them. The raceway 124 is thus cylindrical so that the rolling-elements 13 which are here rollers can roll on it without loss of contact at least at the level of a cylindrical contact area of the roller on the second raceway 124.

In the bearing 1, the middle ring 11 is sandwiched axially between the two side rings 15 (FIGS. 1 and 3).

The annular ribs 155 then extend towards the middle ring 12 and the rolling-elements 13. Specifically, the annular ribs 155 comprise an inclined surface 1550 (FIG. 2A). The inclined surface 1550 faces the rolling-elements 13 and extends radially outward and axially toward the lubricant inlet 1200 (FIG. 3). The inclined surface 1550 assists in guiding the lubricant 19 during the rotation of the bearing 1 and thus acts as a support for the centrifugation of the lubricant 19. Furthermore, the annular ribs 155 are configured to limit the volume of the cavity 20 and thus avoid the presence of dead areas in which the lubricant 19 would accumulate.

As described above, the middle ring 12 is housed in the space 165 defined by the side rings 16.

In addition, the side rings 16 are arranged such that the annular ribs 156 of the side rings 15 each come to house in their respective annular space 168 so as to be rotatably movable therein.

The two sealing rings 17 are respectively arranged at the axial ends of the bearing 1, between the side rings 16 of the external ring 4 and the movable side rings 15 (FIG. 3).

The attachment annulus 18 then hold the sealing rings in place, thus allowing to ensure that the bearing 1 is sealed.

In this configuration, the ducts described above are arranged together as follows (see FIG. 1):
- the ducts 120 of the middle ring 12 are in fluid communication with the ducts 166 of the side rings 16. In other words, the orifice 1201 is joined to the orifice 1660;
- the ducts 166 are in fluid communication with the ducts 152 of the internal rings 15. In other words, here, the ducts 166 open from the annular rim 162 through the orifices 1661 into the annular recess 157;
- the first annular recess 157, the ducts 152 and the second annular recess 158 are in fluid communication, as mentioned above;
- the ducts 152 are in fluid communication with the sub-ducts 1134, 1135 and 1136 of the middle ring 11. In other words, the second annular recess 158 is joined to the orifices 1131 (FIG. 2A).

When the shaft 2 is rotated, the middle ring 11, which is integrally mounted with it, adopts the same rotational movement, i.e. it rotates about the axis A at the same angular speed as the shaft 2. The rolling-elements 13 then move by rolling on the first raceway 112 and on the second raceway 124. In doing so, an internal cylindrical surface 141 of the cage 14 slides on the external cylindrical surface 1111 of the internal ring 3 (FIG. 2A). The rolling-elements 13 each roll about their own axis of rotation (not shown), parallel to the axis of rotation A if the rolling-elements are cylindrical rollers, while following an annular stroke around the middle ring 11.

During this annular stroke, the rolling-elements 13 pass over the orifices 1200, and more precisely roll around the periphery of these orifices 1200, i.e. they pass over the lubricant inlets (FIGS. 1, 3 and 4). The rolling-elements 13 then constrain the lubricant 19 and force it into the ducts 120 via the lubricant inlets 1200.

Similarly, the rolling-elements 13 pass over the lubricant inlets 1132 of the middle ring 11. The rolling-elements 13 then constrain the lubricant 19 and force it into the ducts 113, and more specifically into the sub-ducts 1135, via the lubricant inlets 1132.

The passage of the rolling-elements 13 over the lubricant inlets 1200 and 1132 therefore has the effect of creating a pump effect. This pump effect takes advantage of the kinematics of the rolling-elements 13 to drive the lubricant 19 in a self-sustaining circulation dynamic, allowing lubrication of the components of the bearing 1 as long as the rotation of the internal ring 3 continues. This phenomenon occurs both on the middle ring 11, thanks to the lubricant inlets 1132 positioned at the bottom of the first raceway 112, and on the middle ring 12, thanks to the lubricant inlets 1200 pierced at the periphery of the movable assembly 3.

The above-mentioned pump effect generates lubricant flows F1 and F2.

A first lubricant flow F1 is generated by the rolling-elements 13 passing over the lubricant inlets 1200 (FIGS. 1 and 2A). The flow F1 flows successively through the ducts 120, 166, the recess 157, the duct 152, the recess 158 and the sub-duct 1134 (FIG. 1).

A second lubricant flow F2 is generated by the rolling-elements 13 passing over the lubricant inlets 1132. The flow F2 flows through sub-duct 1135.

The ducts 120, 166, the recess 157, the pipe 152, the recess 158 and the sub-duct 1134, together with the sub-duct 1136 then belong to a first lubricant recirculation circuit 21 (FIG. 2A). The first recirculation circuit here comprises, more particularly, a series of pairs of ducts 120, 166, 152, 1134, 1136, which are regularly distributed around the axis A of the bearing and extend substantially in the same plane P2 passing through the axis A (FIG. 3). A first duct 120, 166, 152, 1134, 1136 extends from a first lubricant inlet 1200 located on the second raceway 124 to a first lubricant outlet 1133 located, as illustrated herein, proximate to the first raceway 112 or, alternatively not shown, on this first raceway 112. A second duct 120, 166, 152, 1134, 1136, symmetrical to the first described above with respect to plane P1, extends from a second lubricant inlet 1200 located on said second raceway 124 to a second lubricant outlet 1133 located, as illustrated herein, in proximity to the first raceway 112, or, alternatively not illustrated, in proximity to this first raceway 112.

The sub-duct 1135 and the sub-duct 1136 form a second lubricant recirculation circuit 22 (FIG. 2A).

The flows F1 and F2 merge into a common flow F3 of lubricant at the junction of the sub-ducts 1134 and 1135. The flow F3 flows radially outwards in the middle ring 11 of the internal ring 3. The flow F3 then opens through the lubricant outlet 1133 into the cavity 20, and then directly lubricates the cage 14. The generation of the flows F1 and F2 generates a self-sustaining demand for lubricant at the level of the raceways 112 and 124 and the lubricant recirculation cycle continues on its own. The recirculation circuits 21 and 22 are therefore self-supplied when the bearing 1 is rotated.

The recirculation circuits 21 and 22 are provided in both the middle rings 11 and 12, and in the side rings 16 and 15.

The recirculation circuits 21 and 22 thus form loop circuits of forced recirculation of lubricant.

Preferably, the side rings 16 and/or the side rings 15 and/or the middle ring 11 is/are produced by additive manufacturing. In particular, this allows to manufacture the recirculation circuits 21 and 22, which are extremely complex due to their multiple curved ducts, without major difficulty.

The bearing 1 described above is intended in particular for an implementation in the aeronautical field, such as in gas turbines (turbomachines, thrusters, auxiliary power units).

The lubricant 19 liquefies to a greater or lesser extent under the effect of temperature, this less viscous state allows to initiate the pump effect and thus activates the recirculation of the lubricant through the bearing 1.

The lubricant 19 is a grease or a liquid lubricant which may be an oil. Preferably, the selected lubricant 19 is a high temperature resistant grease.

In alternatives not shown, the rolling-elements 13 may be balls or conical rollers, rather than cylindrical rollers. In the case of balls, the surface of the second raceway 124 is adapted to the contact with these spherical elements. The second raceway then has a circular arc cross section. Alternatively or cumulatively, in the case of balls, the surface of the first raceway 112 is similarly adapted and may have a circular arc cross section.

The invention claimed is:

1. A rolling-element bearing for a turbomachine, comprising:
   an internal ring defining a first raceway having a first diameter,
   an external ring defining a second raceway,
   a plurality of rolling-elements disposed between the internal and external rings and adapted to roll on the first and second raceways,
   wherein the bearing has at least one loop circuit for forced recirculation of lubricant, said loop circuit comprising a first recirculation circuit comprising at least one lubricant inlet located at the level of the second raceway and connected by at least one first duct created in the external ring to at least one lubricant outlet which opens onto a second recirculation circuit of the loop circuit, said second recirculation circuit comprising at least one second duct created in the internal ring,
   wherein each of said at least one lubricant inlet of the first recirculation circuit forms an orifice opening onto the second raceway, the rolling-elements being able to roll over said orifice.

2. The bearing according to claim 1, wherein the at least one lubricant outlet of the first recirculation circuit is formed by a discharge orifice located at a distance from an axis of the bearing less than or equal to the first diameter of the first raceway.

3. The bearing according to claim 1, further comprising a cage interposed between the rings and holding the rolling-elements spaced apart, said cage comprising at least one internal surface which is adapted to slide on an external surface of the internal ring, and wherein said at least one second duct of the second recirculation circuit is radially oriented and opens from said external surface facing said internal surface, said internal surface having a diameter greater than a diameter of said external surface so that lubricant coming from said at least one second duct can open into a cavity of the housing of the cage.

4. The bearing according to claim 3, wherein the rolling-elements as well as the external surface of the internal ring and the internal surface of the cage are cylindrical.

5. The bearing according to claim 1, wherein the first recirculation circuit comprises said at least one lubrication inlet includes two lubricant inlets, said two lubrication inlets being aligned along an axial direction parallel to an axis of the bearing.

6. The bearing according to claim 1, wherein said at least one lubrication inlet comprises a series of pairs of lubricant inlets located at the level of the second raceway, and said at least one first duct comprises a series of pairs of ducts associated with said series of pairs of lubricant inlets, the series of pairs of ducts being evenly distributed around an axis of the bearing, and the ducts of each pair extending substantially in a same plane passing through said axis.

7. The bearing according to claim 6, wherein the ducts of each pair are symmetrical with respect to a median plane perpendicular to said axis and passing substantially in the middle of the bearing.

8. The bearing according to claim 1, wherein said at least one first duct includes two first ducts, said two first ducts being created in the external ring and extending on either side of a median plane of the bearing, perpendicular to said axis and passing substantially in the middle of the bearing.

9. The bearing according to claim 1, wherein each of said at least one first duct of the first recirculation circuit comprises a first portion extending radially outwardly from the lubricant inlet and extended by a second portion which progresses mainly towards an axis of the bearing, said second portion leading to the lubricant outlet which opens onto the second recirculation circuit.

10. The bearing according to claim 9, wherein the lubricant outlet is engaged in a lubricant inlet manifold of the second recirculation circuit formed by an annular recess of the internal ring, said annular recess having a bottom which opens out into said at least one second duct of the second recirculation circuit.

11. The bearing according to claim 1, wherein the rolling-elements are rollers.

12. The bearing according to claim 1, wherein the bearing comprises sealing systems between the internal and external rings, on either side of said rolling-elements.

13. The bearing according to claim 1, wherein the internal ring or at least one element rotationally integral with the internal ring comprises annular ribs for guiding lubricant by centrifuging towards said lubricant inlet, said annular ribs extending on both sides of the rolling-elements towards the external ring.

14. A turbomachine, comprising at least one bearing according to claim 1, and wherein the internal ring of the bearing is rotationally integral with a rotary shaft of the turbomachine while the external ring is attached to a stator portion of the turbomachine.

* * * * *